United States Patent Office 3,482,958
Patented Dec. 9, 1969

3,482,958
METHOD FOR INCREASING THE SUGAR CONTENT OF SUGAR CANE
Louis G. Nickell and Tyrus T. Tanimoto, Honolulu, Hawaii, assignors to Hawaiian Sugar Planters Association, Honolulu, Hawaii, a non-profit agricultural association of Hawaii
No Drawing. Filed Apr. 5, 1967, Ser. No. 628,555
Int. Cl. A01n 5/00
U.S. Cl. 71—92                                      7 Claims

ABSTRACT OF THE DISCLOSURE

The maturation of growing sugar cane is accelerated and the sucrose accumulation in it is increased by applying an effective amount of an acid addition salt of an alkylmercapto-1,4,5,6-tetrahydropyrimidine, generally as an aqueous solution, to the sugar cane several weeks before harvest.

BACKGROUND OF THE INVENTION

This invention relates to a process for controlling the maturation and sucrose accumulation in growing sugar cane. It has been surprisingly and unexpectedly discovered that application to the upper portion, particularly the leaves and growing point (spindle area) of the sugar cane plant, with the acid addition salts of a series of (higher alkyl) mercapto-1,4,5,6-tetrahydropyrimidine several weeks before harvest, suppresses the terminal growth of the sugar cane, thereby, in effect, inducing an early ripening of the sugar cane and thus increasing the sucrose content of the sugar cane.

It is presently believed that treatment with active compounds that induce artificial ripening of sugar cane apparently causes the conversion of various carbohydrates, especially reducing sugars, present in the growing sugar cane into sucrose. Thus treatment of a sugar cane crop with these compounds leads to an increase in the yield of sucrose when the crop is harvested and appropriately processed.

In the past, various compounds have been utilized to artificially ripen growing sugar cane. Invariably, these compounds have been applied to the sugar cane several weeks prior to harvesting. One series of compounds has included the halo-substituted benzoic acids, particularly 2,3,6-trichlorobenzoic acid and its salts, as shown in U.S. 3,245,775. Unfortunately, this latter compound is somewhat phytotoxic. A further disadvantage in its use, is the fact that it is apparently quite resistant to microbiological degradation, and consequently persists in unaltered form on the plant and in the soil for considerable periods of time, see T. W. Donaldson and C. L. Foy, Weeds, 13, 195 (1965); W. M. Phillips, Weeds, 7, 284 (1959). This undesirable property is also evidenced by the fact that when this compound is applied to wheat foliage or roots, it is found in both the seeds and straw of the plant at harvest, and when fed to rabbits and mice some of the compound is isolated from the excreta, see P. G. Balayannis, M. S. Smith and R. L. Wain, Ann. Appl. Biol., 55, 149 (1965). It is therefore probable that pharmacologically significant amounts of this compound will appear in harvested cane, and it is not inconceivable that some might in the final processed sugar after harvesting and processing cane to which this type of compound has been applied.

Another series of compounds which have been used in ripening sugar cane are substituted uracils and derivatives thereof (see A. W. Evans, U.S. Patent 3,291,592, Dec. 13, 1966).

We have now found that the acid addition salts of (higher alkyl) mercapto-1,4,5,6-tetrahydropyrimidine are effective in artificially ripening sugar cane and in addition, these compounds have the further advantages of being biodegradable and not unduly phytotoxic.

SUMMARY OF THE INVENTION

This invention comprises a method of accelerating the maturation of growing sugar cane and increasing the sucrose accumulation therein by applying thereto several weeks before harvest compounds of the general formula:

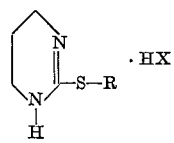

wherein:

R is an alkyl group containing from 8 to 20 carbon atoms; and
HX is a nonphytotoxic acid, e.g., HCl, HBr, citric, etc.

The compounds of the present invention are applied to the tops of growing sugar cane, preferably about 2 to 10 weeks before harvesting time, by any of the usual means well-known in the art, for instance by appropriately spraying them in the form of an aqueous solution, preferably containing a surfactant in order to provide more effective wetting of the plant.

The spraying can be accomplished either by a mechanical or hydraulic agricultural sprayer, or alternatively from an airplane, the exact mode depending upon the size of the area to be sprayed. The application of these compounds to the upper portion of the growing sugar cane plant suppresses the terminal growth thereof and artificially ripens the plant and increases its sucrose content. Thus when the sugar cane, treated as described above, is subsequently harvested and processed by methods well-known to those skilled in the art, the yields of sucrose obtained are considerably increased, as compared with those obtained from non-treated sugar cane.

DETAILED DESCRIPTION OF THE INVENTION

The compounds of the present invention can be conveniently prepared by the methods described in U.S. Patent 3,219,522, Nov. 23, 1965, issued to P. N. Gordon. In these compounds, the alkyl group, R, may be either branched or unbranched, and the acid, HX, may be any phytologically acceptable acid, i.e., nonphytotoxic.

Among the acids, HX, which may be used are HCl, HBr, HI, acetic, citric, and lactic; and of these we prefer HCl and HBr.

These salts are readily soluble in water and may be conventiently dissolved in that medium for application to the sugar cane. The amount of compound to be applied may vary from about 2 to 10 pounds per acre. We ordinarily dissolve this amount of salt in about 6 to 15 gallons of water, the exact volume depending upon the method of application and the requisite equipment.

It has also been found desirable to add a suitable surfactant to the aqueous salt solution in order to provide more effective "wetting" of the sugar cane by the applied salt solution. We prefer to use about 0.05 to 1% weight/weight (w./w.) of surfactant to the aqueous solution. Normally we add the surfactant to the water before adding the salt, but this operation is not critical and the salt may be added first. We prefer to use non-ionic surfactants such as "Tergitol NPX" (nonyl phenyl ether of polyethylene glycol), "Tergitol XD" (polyalkylene glycol ether), and the "Carbowax" polyethylene glycols, all available from Union Carbide Corp., New York, N.Y. Other suitable surfactants which may be employed can be found in "Detergents and Emulsifiers—Up-to-Date," John W. McCutcheon, Inc., Morristown, N.J. 1962.

Although we prefer to apply these compounds as aqueous solutions, other suitable carriers such as oils, e.g., hydrocarbons, and oil-water emulsions may be used.

The compounds of the present invention are usually applied to the growing sugar cane about 2 to 10 weeks before harvest and preferably about 4 to 5 weeks before harvest. Aqueous solutions of these compounds may conveniently be applied to the plants either by spraying from airplanes, or by means of standard agricultural sprayers.

Although the exact biochemical processes which occur in the growing plants after contact with the salts described herein is not fully understood, it appears that these compounds suppress the growth of the terminal portion of the plant, the overall effect being an artificial ripening of the sugar cane plant. It also seems that various carbohydrates in the plant are converted to sucrose. Consequently, when the treated sugar cane is harvested there is a significant increase in the total yield of sucrose from the crop. In order to demonstrate this more effectively, we have treated individual sugar cane stalks with these compounds several weeks before harvest. To avoid sampling errors, older cane, preferably 13 to 23 months old are employed in the tests. For each concentration of compound employed, a minimum of 5 stalks are used processed, and the total values obtained are averaged for each stalk. In order to improve the accuracy of the analyses, only the terminal 15 joints of each stalk are used. An identical number of untreated sugar cane stalks, of the same age, are similarly processed to provide a control. A comparison of the values obtained for the treated cane with the control sample provides a convenient means of determining the effectiveness of these compounds as ripening agents.

The analyses are carried out by the press method of cane analyses, developed by T. Tanimoto and reported in Hawiian Planters' Record, Volume 57, p. 133. The data are expressed as juice purity and pol percent cane. Pol percent cane is a polarimetric determination and will equal the percentage of sucrose if it is the only substance in the solution which will rotate the plane of polarized light. In any event, a determination of pol percent cane is considered by those skilled in the art as an effective means of determining the sucrose content of sugar cane juice.

The following examples are provided to more fully illustrate the present invention, but are not to be construed as limiting the scope thereof in any way.

EXAMPLE I

About 4 weeks before harvesting, 38 mg. of 2-laurylmercapto - 1,4,5,6 - tetrahydropyrimide·HCl is dissolved in a small amount of water that contains about 0.5% (w./w.) of Tergitol NPX, and such a resultant solution is applied to the tip of each of ten 23-month old growing sugar cane stalks.

This treatment suppresses terminal growth of the sugar cane plant.

After the above sugar cane are harvested, the top 15 joints of each plant are removed, combined, and analyzed, as previously described, to give the results below:

|  | Juice Purity | Pol Percent Cane |
|---|---|---|
| Control * | 72.05 | 8.38 |
| 2-laurylmercapto-1,4,5,6-tetrahydropyrimidine·HCl | 77.40 | 10.38 |

* Results of the analysis of 10 non-treated sugar cane stalks.

EXAMPLE II

The procedure of Example I is followed with the exception that the solution of 2 - laurylmercapto - 1,4,5,6- tetrahydropyrimidine·HCl is applied to the plants about 5 weeks before harvesting. The results below are obtained:

|  | Juice Purity | Pol Percent Cane |
|---|---|---|
| Control * | 73.74 | 9.24 |
| 2-laurylmercapto-1,4,5,6-tetrahydropyrimidine·HCl | 86.64 | 13.15 |

* Results of the analysis of 10 non-treated sugar cane stalks.

EXAMPLE III

About 4 weeks before harvesting, 38 mg. of 2 - tetradecylmercapto - 1,4,5,6 - tetrahydropyrimidine·HBr is dissolved in a small amount of water containing about 0.5% (w./w.) of Tergitol XD, and the resultant solution is applied to the tip or spindle of each of ten 23-month old growing sugar cane stalks. After the sugar cane are harvested, the top 15 joints of each plant are removed, combined and analyzed as previously described, to give the results below:

|  | Juice Purity | Pol Percent Cane |
|---|---|---|
| Control * | 72.05 | 8.38 |
| 2-tetradecylmercapto-1,4,5,6-tetrahydropyrimidine·HBr | 79.40 | 10.45 |

* Results of the analysis of 10 non-treated sugar cane stalks.

EXAMPLE IV

About 5–6 pounds of 2 - laurylmercapto - 1,4,5,6 - tetrahydropyrimidine·HCl is dissolved in 8–10 gallons of water containing approximately 0.5% (w./w.) of Tergitol XD.

This solution is then sprayed over an acre of sugar cane approximately 5 weeks before harvesting. When the sugar crop is harvested and processed there is a substantial increase in the yield of sugar obtained.

EXAMPLE V

About 5–6 pounds of 2 - tetradecylmercapto - 1,4,5,6- tetrahydropyrimidine·HBr is dissolved in 8–10 gallons of water containing approximately 0.5% (w./w.) of Tergitol XD.

This solution is then sprayed over an acre of sugar cane approximately 5 weeks before harvesting. When the sugar cane crop is harvested and processed there is a substantial increase in the yield of sugar obtained.

EXAMPLE VI

Following the procedures described in Examples I to IV, substantially the same results are obtained when the acid addition salts below are used.

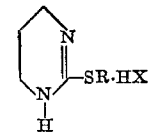

| R | HX | Time of application before harvest (weeks) |
|---|---|---|
| n-$C_8H_{17}$ | HCl | 2 |
| $(CH_3)_2CH(CH_2)_5$- | HCl | 4 |
| n-$C_9H_{19}$ | HBr | 3 |
| $(C_2H_5)_2CH(CH_2)_4$- | HI | 6 |
| n-$C_{10}H_{21}$ | HCl | 10 |
| n-$C_{11}H_{23}$ | HBr | 9 |
| n-$C_{13}H_{27}$ | HCl | 8 |
| $(CH_3)_2CH(CH_2)_{10}$- | HCl | 10 |
| n-$C_{15}H_{31}$ | HCl | 5 |
| n-$C_{18}H_{37}$ | HBr | 5 |
| n-$C_{20}H_{41}$ | HBr | 5 |

What is claimed is:
1. A method for accelerating the maturation of, and sucrose accumulation in, growing sugar cane, which comprises applying to the tops of the growing cane 2 to 10 weeks before harvest thereof, an effective amount of a compound having the formula:

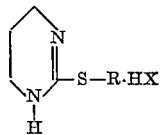

wherein:
R is an alkyl group containing from 8 to 20 carbon atoms; and
HX is a nonphytotoxic acid.

2. The method of claim 1, wherein the active compound is selected from the group having the said formula of claim 1, wherein:
R is n-$C_{12}H_{25}$; and
HX is a nonphytotoxic acid.

3. The method of claim 1, wherein the active compound is selected from the group having the formula of claim 1, wherein:
R is n-$C_{14}H_{29}$; and
HX is a nonphytotoxic acid.

4. The method of claim 1, wherein the active compound is 2-laurylmercapto - 1,4,5,6 - tetrahydropyrimidine hydrochloride.

5. The method of claim 1, wherein the active compound is 2-tetradecylmercapto - 1,4,5,6 - tetrahydropyrimidine hydrobromide.

6. The method of claim 1, wherein the active compound is applied as an aqueous spray, said aqueous spray being formed from an aqueous solution containing 2 to 10 pounds of active compound per 6 to 16 gallons of water.

7. The method of claim 1, wherein 2 to 10 pounds of active compound per acre of growing sugar cane are applied.

References Cited

Nickell et al., Haw. Sugar Technol. 24th Annual Conference, Nov. 15–18, 1965, pp. 152 to 163.

JAMES O. THOMAS, JR., Primary Examiner